(12) United States Patent
Schriesheim et al.

(10) Patent No.: US 12,089,801 B2
(45) Date of Patent: *Sep. 17, 2024

(54) SCHEDULING AND CONTROL SYSTEM FOR AUTONOMOUS ROBOTS

(71) Applicant: iRobot Corporation, Bedford, MA (US)

(72) Inventors: Benjamin H. Schriesheim, Watertown, MA (US); Cory White, Newburyport, MA (US); Brent Hild, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,767

(22) Filed: Apr. 17, 2023

(65) Prior Publication Data

US 2023/0248199 A1 Aug. 10, 2023

Related U.S. Application Data

(63) Continuation of application No. 17/107,758, filed on Nov. 30, 2020, now Pat. No. 11,638,510, which is a
(Continued)

(51) Int. Cl.
*G05B 19/042* (2006.01)
*A47L 9/28* (2006.01)
(Continued)

(52) U.S. Cl.
CPC ........... *A47L 9/2857* (2013.01); *A47L 9/2826* (2013.01); *A47L 9/2852* (2013.01); *A47L 9/2894* (2013.01);
(Continued)

(58) Field of Classification Search
CPC G05D 1/0044; G05D 1/0016; G06F 3/04817; G06F 3/0486; G05B 19/042;
(Continued)

(56) References Cited

U.S. PATENT DOCUMENTS 6,883,201 B2 4/2005 Jones et al.
7,085,814 B1 8/2006 Gandhi et al.
(Continued)

FOREIGN PATENT DOCUMENTS

CN 102789231 11/2012
CN 104470685 3/2015
(Continued)

OTHER PUBLICATIONS

Miloshevich, Mimica, and Aybeyan Selim. An abstract of "Development of computer maintenance and troubleshooting skills training." International Scientific Journal Vision 1.1 (2016): 74-93. (Year: 2016).*
(Continued)

*Primary Examiner* — Cuong H Nguyen
(74) *Attorney, Agent, or Firm* — Fish & Richardson P.C.

(57) ABSTRACT

An autonomous cleaning robot including a drive configured to move the cleaning robot across a floor surface in an area to be cleaned and a controller. The controller is configured to receive data representing an editable mission timeline including data representing a sequence of rooms to be cleaned, navigate the cleaning robot to clean the rooms following the sequence, track operational events occurring in each of the rooms, and transmit data about time spent navigating each room included in the sequence.

20 Claims, 10 Drawing Sheets

Related U.S. Application Data continuation of application No. 15/612,368, filed on Jun. 2, 2017, now abandoned.

(51) Int. Cl.
*G05D 1/00* (2006.01)
*G06F 3/048* (2013.01)
*G06F 3/04817* (2022.01)
*G06F 3/0486* (2013.01)

(52) U.S. Cl.
CPC ......... *G05B 19/042* (2013.01); *G05D 1/0016* (2013.01); *G05D 1/0044* (2013.01); *G06F 3/04817* (2013.01); *G06F 3/0486* (2013.01); *A47L 2201/04* (2013.01); *G05B 2219/25419* (2013.01); *G05B 2219/45098* (2013.01)

(58) Field of Classification Search
CPC ........... G05B 2219/2519; A47L 9/2821; A47L 9/2831; A47L 9/2894; A47L 9/2826
USPC .............................................. 701/23; 700/245
See application file for complete search history.

(56) References Cited

U.S. PATENT DOCUMENTS

| | | | |
|---|---|---|---|
| 7,113,847 B2 | 9/2006 | Chmura et al. | |
| 7,308,321 B2 | 12/2007 | Drouet et al. | |
| 7,418,762 B2 | 9/2008 | Arai et al. | |
| 7,992,251 B2 | 8/2011 | Chung et al. | |
| 8,437,875 B2 | 5/2013 | Hernadez et al. | |
| 8,474,090 B2 | 7/2013 | Jones et al. | |
| 8,594,840 B1 | 11/2013 | Chiappetta et al. | |
| 8,838,268 B2 | 9/2014 | Friedman et al. | |
| 8,972,061 B2 | 3/2015 | Rosenstein et al. | |
| 9,043,017 B2 | 5/2015 | Jung et al. | |
| 9,138,120 B2 | 9/2015 | Hsu | |
| 9,319,234 B2 | 4/2016 | Davis et al. | |
| 9,375,847 B2 | 6/2016 | Angle et al. | |
| 9,380,922 B2 | 7/2016 | Duffley et al. | |
| 9,392,920 B2 | 7/2016 | Halloran et al. | |
| 9,438,440 B2 | 9/2016 | Burns et al. | |
| 9,465,377 B2 | 10/2016 | Davis et al. | |
| 9,486,924 B2 | 11/2016 | Dubrovsky et al. | |
| 9,521,009 B1 | 12/2016 | Skeffington | |
| 9,529,363 B2 | 12/2016 | Chiappetta et al. | |
| 9,529,514 B2 | 12/2016 | Saint Clair | |
| 9,532,094 B2 | 12/2016 | Karp et al. | |
| 9,547,982 B2 | 1/2017 | De Clercq et al. | |
| 9,589,459 B2 | 3/2017 | Davis et al. | |
| 9,596,708 B2 | 3/2017 | Logue et al. | |
| 9,602,301 B2 | 3/2017 | Averitt | |
| 9,622,633 B2 | 4/2017 | Kim et al. | |
| 9,661,971 B2 | 5/2017 | Riehl | |
| 9,802,322 B2* | 10/2017 | Angle | G05B 15/02 |
| 10,435,279 B2 | 10/2019 | Taylor et al. | |
| 10,478,037 B2 | 11/2019 | Duenne et al. | |
| 11,046,562 B2 | 6/2021 | High et al. | |
| 11,638,510 B2 | 5/2023 | Schriesheim et al. | |
| 11,648,685 B2* | 5/2023 | Angle | G05D 1/0022 |
| | | | 701/2 |
| 2005/0143840 A1* | 6/2005 | Matsukura | G05B 19/0423 |
| | | | 700/20 |
| 2005/0251457 A1 | 11/2005 | Kashiwagi | |
| 2006/0190146 A1 | 8/2006 | Morse et al. | |
| 2006/0235570 A1 | 10/2006 | Jung | |
| 2007/0016328 A1 | 1/2007 | Ziegler et al. | |
| 2007/0213892 A1 | 9/2007 | Jones et al. | |
| 2007/0271011 A1 | 11/2007 | Lee et al. | |
| 2008/0140255 A1 | 6/2008 | Ziegler et al. | |
| 2012/0042003 A1* | 2/2012 | Goetz | G06F 9/5066 |
| | | | 718/100 |
| 2012/0158915 A1 | 6/2012 | Ham et al. | |
| 2012/0168240 A1 | 7/2012 | Wilson et al. | |
| 2012/0259481 A1 | 10/2012 | Kim | |
| 2012/0316636 A1 | 12/2012 | Young et al. | |
| 2013/0060379 A1 | 3/2013 | Choe et al. | |
| 2013/0061415 A1 | 3/2013 | Samuels et al. | |
| 2013/0138247 A1* | 5/2013 | Gutmann | G01S 17/06 |
| | | | 901/1 |
| 2015/0000068 A1 | 1/2015 | Tsuboi et al. | |
| 2015/0326621 A1 | 11/2015 | Roessler et al. | |
| 2015/0354964 A1 | 12/2015 | Schneider et al. | |
| 2016/0091899 A1 | 3/2016 | Aldred et al. | |
| 2016/0109884 A1 | 4/2016 | Chiappetta | |
| 2016/0135655 A1 | 5/2016 | Ahn et al. | |
| 2016/0167234 A1* | 6/2016 | Angle | G05B 15/02 |
| | | | 701/2 |
| 2016/0302636 A1 | 10/2016 | Kim et al. | |
| 2016/0359325 A1 | 12/2016 | Ahn et al. | |
| 2016/0374526 A1 | 12/2016 | Yang et al. | |
| 2017/0079498 A1 | 3/2017 | Kim et al. | |
| 2017/0118825 A1 | 4/2017 | Unoson et al. | |
| 2018/0107446 A1* | 4/2018 | Wilberding | G06F 3/165 |
| 2018/0344116 A1 | 12/2018 | Schriesheim et al. | |
| 2019/0011413 A1* | 1/2019 | Caussy | G01N 33/0075 |
| 2019/0082918 A1 | 3/2019 | Koetz | |
| 2019/0094869 A1 | 3/2019 | Artes | |
| 2021/0076892 A1 | 3/2021 | Schriesheim et al. | |

FOREIGN PATENT DOCUMENTS

| | | |
|---|---|---|
| CN | 106037591 | 10/2016 |
| CN | 106793905 | 5/2017 |
| EP | 2381328 | 10/2011 |
| EP | 2511782 | 10/2012 |
| JP | 2007-213395 | 8/2007 |
| JP | 2009-031992 | 2/2009 |
| JP | 2011-103721 | 5/2011 |
| JP | 2016-077512 | 5/2016 |
| JP | 2016-513981 | 5/2016 |
| JP | 2016-540549 | 12/2016 |
| JP | 2020-521515 | 7/2020 |
| KR | 10-2006-0070958 | 6/2006 |
| WO | WO 2016/027957 | 2/2016 |
| WO | WO 2016/048077 | 3/2016 |
| WO | WO 2016/103071 | 6/2016 |
| WO | WO 2016/105702 | 6/2016 |

OTHER PUBLICATIONS

Leidner, Daniel, et al. An abstract of "Knowledge-enabled parameterization of whole-body control strategies for compliant service robots." Autonomous Robots 40 (2016): 519-536. (Year: 2016).*

Huang, Justin, Tessa Lau, and Maya Cakmak. "Design and evaluation of a rapid programming system for service robots." 2016 11th ACM/IEEE International Conference on Human-Robot Interaction (HRI). IEEE, 2016. (Year: 2016).*

J. Fan, L. Beuscher, P. A. Newhouse, L. C. Mion and N. Sarkar, "A robotic coach architecture for multi-user human-robot interaction (RAMU) with the elderly and cognitively impaired," 2016 25th IEEE Inter Symp on Robot and Human Interactive Communication ( RO-MAN), New York, NY, USA, 2016, pp. 445-450, (Year: 2016).*

Jing Fan et al, A robotic coach architecture for multi-user Human Robot Interaction (Year: 2016).*

"Black + Decker app. By Stanley Black & Decker, Inc.," iTunes Preview via Apple Inc., May 16, 2017, retrieved from the Internet on Jun. 1, 2017, <https://itunes.apple.com/us/app/black-decker/id1097648295?mt=8>, 3 pages.

"Hoover Quest 1000 Instruction Manual," Techtronic Floor Care Technology Limited 2016, retrieved from the Internet on Jun. 1, 2017, <https://hoover.com/file/2178/>, 52 pages.

"Hoover Quest 600, Quest 700, Quest 800 Instruction Manuel," Techtronic Floor Care Technology Limited 2016, retrieved from the internet on Jun. 1, 2017, <https://hoover.com/file/2173/>, 56 pages.

"How to use your robot," Dyson 360 Eye User Manual, retrieved from the Internet on Jun. 1, 2017, <https://www.dyson.co.uk/medialibrary/Files/Dyson/Support/downloads/UK/floorcare/Manuals/360_Eye_Manual_UK.pdf>, 32 pages.

(56) References Cited

OTHER PUBLICATIONS

"iRobot Roomba 900 Owner's Manual," iRobot Corporation, 2015, 36 pages.
"Neato Botvac D3 Connected, Botvac D5 connected," Neato Robotics Inc., 2016, retrieved from the internet on Jun. 1, 2017, <https://004ad429deffb6ec83la-519cff0c4aadf0882029ee8826ed368e.ssl.cf5.rackcdn.com/Neato_User_Guide_D3_D5_10-Lang_EMEA_HR_Rev_2.pdf>, 164 pages.
"Neato Products Set Up Guide," Neato Robotics, Inc., 2016, retrieved from the internet on Jun. 1, 2017, <http://9896d21996451ba802bb-35ef0235e67679408ce08cbf73c43dde.r94.cf2.rackcdn.com/Docs/neato_productsetupguide_emea_10_lang_lr.pdf>, 2 pages.
CN 102789231 B issued to Chen et al., "Cleaning system and control method there of", published on Nov. 18, 2015, 8 pages.
Dogru et al. "Energy Efficient Coverage Path Planning for Autonomous Mobile Robots on 3D Terrain," 2015 IEEE International Conference on Autonomous Robot Systems and Competitions, May 7, 2015, pp. 118-123.
Dubey et al., "An FPGA based service Robot for floor cleaning with autonomous navigation," 2016 International Conference on Research Advances in Integrated Navigation Systems (RAINS), Apr. 6-7, 2016, pp. 1-6.
EP European Search Report in EP Appln. No. 17901335, dated Nov. 27, 2020, 9 pages.
Hasan et al., "Path planning algorithm development for autonomous vacuum cleaner robots," 3rd International Conference on Informatics, Electronics & Vision 2014, May 23-24, 2014, 6 pages.
International Preliminary Report on Patentability in International Appln. No. PCT/US2017/059064, dated Dec. 12, 2019, 7 pages.
International Search Report and Written Opinion in International Patent Application No. PCT/US2017/59064, dated Jan. 26, 2018, 7 pages.
Janchiv et al., "Complete coverage path planning for multi-robots based on," 2011 11th International Conference on Control, Automation and Systems, Oct. 26-29, 2011, pp. 824-827.
Vasan et al., "A Control Strategy for an Autonomous Robotic Vacuum Cleaner for Solar Panels," Texas Instruments India Educators Conference (TIIEC), Apr. 4-5, 2014, 9 pages.
Wei, "Design of Control System for Dust-Collecting Robot Based on DSP," International Conference on Computer Network, Electronic and Automation (ICCNEA), Sep. 23-25, 2017, 4 pages.
Yakoubi et al., "The path planning of cleaner robot for coverage region using Genetic Algorithms," Journal of Innovation in Digital Ecosystems, Jun. 2016, pp. 37-43.

\* cited by examiner

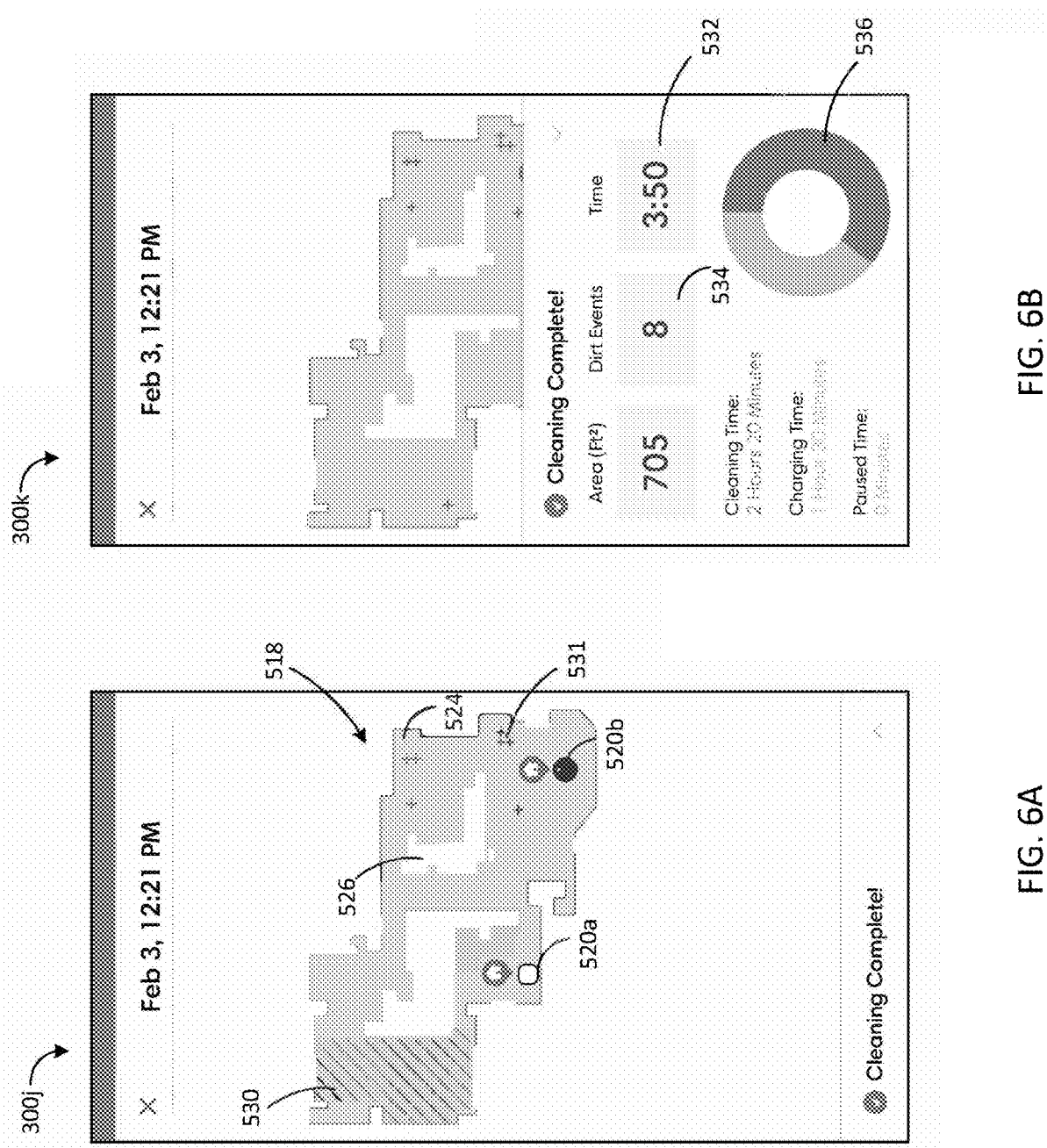

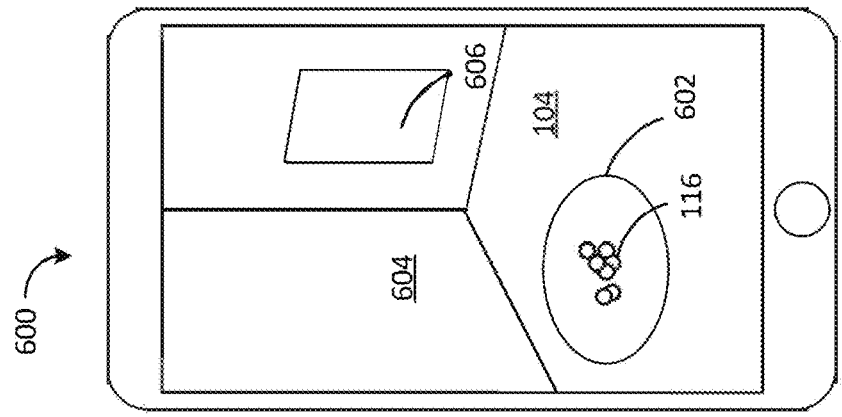
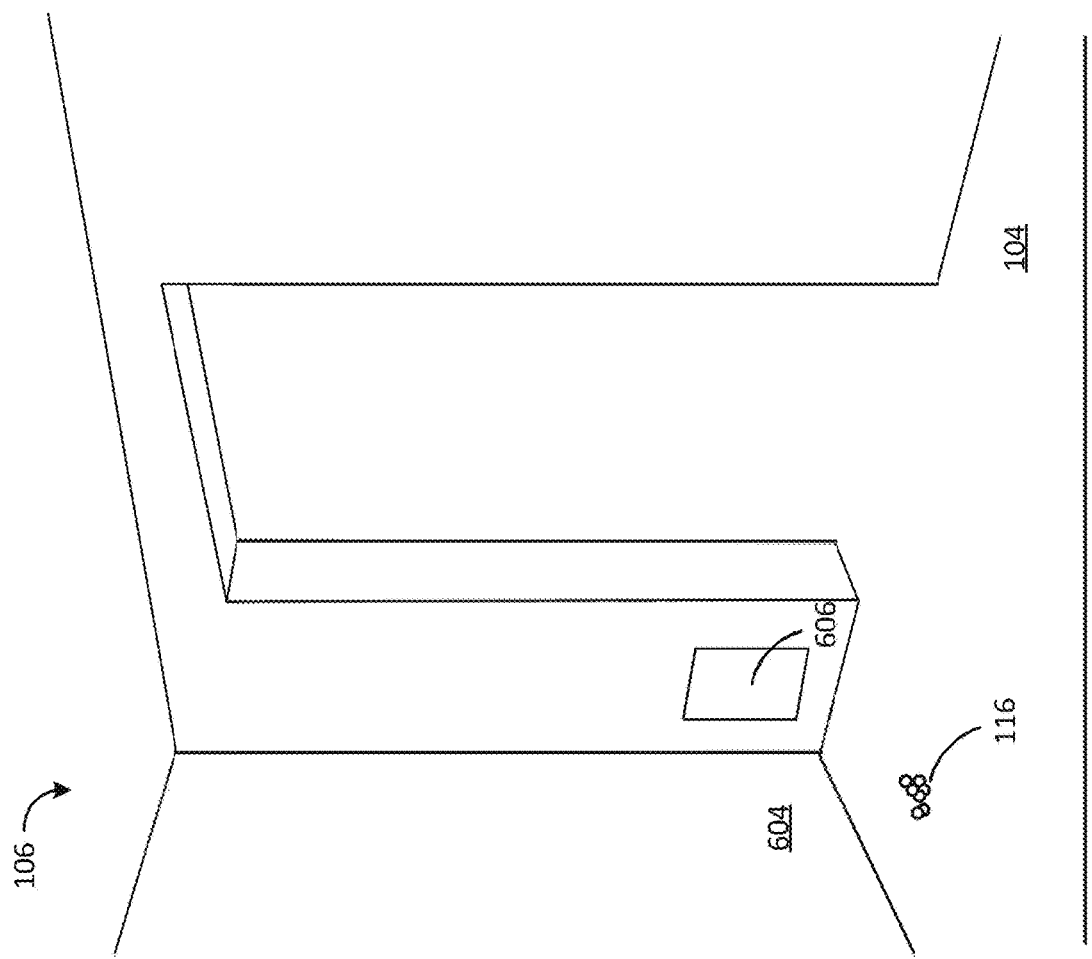

SCHEDULING AND CONTROL SYSTEM FOR AUTONOMOUS ROBOTS

CROSS-REFERENCE TO RELATED APPLICATIONS

This application is a continuation application of, and claims priority to, U.S. patent application Ser. No. 17/107,758, now U.S. Pat. No. 11,638,510, filed on Nov. 30, 2020, which is a continuation application of, and claims priority to, U.S. patent application Ser. No. 15/612,368, now Abandoned, filed on Jun. 2, 2017. The disclosure of the foregoing application is incorporated herein by reference in its entirety for all purposes.

TECHNICAL FIELD

This specification relates generally to scheduling and control systems for autonomous cleaning robots. One exemplary system described herein is a mission timeline for scheduling and controlling a mobile cleaning robot.

BACKGROUND

Cleaning robots include mobile robots that autonomously perform cleaning tasks within an environment, e.g., a home. Many kinds of cleaning robots are autonomous to some degree and in different ways. The cleaning robots include a controller that is configured to autonomously navigate the cleaning robot about the environment such that the cleaning robot can ingest debris as it moves.

SUMMARY

An autonomous cleaning robot may be controlled directly by a user (e.g. by pushing a button on the robot) or remotely (e.g. by a mobile application). A mobile application can be used to monitor the status of the autonomous cleaning robot as it executes a cleaning mission and make changes to the cleaning mission as it is executed. A mobile application may include a mission timeline displaying a status and schedule of the cleaning mission. A mobile application may also include a map to allow the user to visualize a location of the robot, which rooms have been cleaned, and which rooms are scheduled to be cleaned during the cleaning mission.

The user can, through the mobile application, change cleaning parameters, scheduling, or a cleaning status of the autonomous cleaning robot. As the autonomous cleaning robot executes the cleaning mission, operational events and a status of the robot may be displayed allowing the user to continue to monitor, and change if desired, the cleaning mission.

Described herein are examples of robots configured to traverse floor surfaces and perform various operations including, but not limited to, cleaning. In one aspect, an autonomous cleaning robot includes a drive configured to move the cleaning robot across a floor surface in an area to be cleaned and a controller. The controller is configured to receive data representing an editable mission timeline including data representing a sequence of rooms to be cleaned, navigate the cleaning robot to clean the rooms following the sequence, track operational events occurring in each of the rooms cleaned, and transmit data about time spent navigating each of the rooms navigated included in the sequence.

In some implementations, the controller is configured to track time to complete cleaning each room included in the sequence and, upon completion of cleaning each room, transmit the time for display.

In some implementations, the data representing a sequence of rooms to be cleaned comprises an indication of at least a first room to be cleaned and a second room to be cleaned and wherein the controller is configured to: clean the first room to be cleaned, transmit data about the time spent cleaning the first room, clean the second room to be cleaned, and transmit data about the time spent cleaning the second room.

In some implementations, the controller is configured to, during a cleaning operation, receive a re-ordered sequence of rooms to be cleaned.

In some implementations, the controller is configured to, subsequent to receiving a sequence of rooms to be cleaned, receive an indication to cancel cleaning a room in the sequence of rooms to be cleaned, and clean the rooms in the sequence except for the cancelled room.

In some implementations, the controller is configured to transmit data representing a tracked operational event to be remotely represented on a graphical representation of an editable mission timeline.

In some implementations, the controller is configured to transmit data representing a tracked operational event to be presented on a graphical representation of a map.

In some implementations, tracking an operational event comprises tracking where the cleaning robot performed additional cleaning in response to detected dirt.

In some implementations, tracking an operational event comprises detecting completion of cleaning a room.

In some implementations, the operational event is a bin emptying event and the controller is further configured to compute an elapsed time to address the bin emptying event and to initiate transmission of data indicating the elapsed time.

In some implementations, the operational event is a bin emptying event and the controller is further configured to initiate transmission of data indicating the operational event to be presented on a graphical representation of an editable mission timeline.

In some implementations, the controller is configured to receive data indicating a set of cleaning parameters to be used in a room and the set of cleaning parameters includes at least one of a vacuum power, an edge cleaning setting, a multiple pass setting, and a wet or dry mopping parameter.

In some implementations, the controller is configured to determine a charge level of a battery of the robot, transmit data representing the charge level, and receive a charging instruction comprising a charging period required to charge the battery to allow the cleaning robot to complete cleaning the rooms in the sequence.

In some implementations, wherein the controller is configured to navigate the cleaning robot to a charging station based on the charging period and transmit data indicating an elapsed charging time for display.

In another aspect, a handheld computing device includes one or more input devices, a display, and a processor. The processor is configured to initiate data transmission and reception with an autonomous cleaning robot, and present a first graphical representation of an editable mission timeline. The editable mission timeline includes an arrangement of a plurality of icons, each icon representing a room to be cleaned by the autonomous cleaning robot, to represent a sequence of rooms to be cleaned, and, for each icon of the plurality of icons, a corresponding representation to reflect a time spent cleaning each respective room. At least one of the plurality of icons are user-manipulatable, using the one or more input devices, to adjust the sequence of rooms to be cleaned.

In some implementations, only the icons representing rooms remaining to be cleaned are user-manipulatable.

In some implementations, the processor further configured to present a graphical representation of a map indicating rooms cleaned and rooms to be cleaned.

In some implementations, one or more events detected by the autonomous cleaning robot are presented on the graphical representation of a map.

In some implementations, an event detected by the autonomous cleaning robot includes an event where the robot detected excess dirt and performed additional cleaning.

In some implementations, an event detected by the autonomous cleaning robot includes an event where the robot indicates completion of cleaning a room.

In some implementations, a graphical representation of the event detected by the autonomous cleaning robot is inserted in the graphical representation of the editable mission timeline.

In some implementations, the processor is configured to present the first graphical representation of an editable mission timeline for the autonomous cleaning robot and a second graphical representation of an editable mission timeline for another autonomous cleaning robot.

In some implementations, the processor is configured to initiate transmission of data representing the sequence of rooms to be cleaned to the robot during a cleaning mission.

In some implementations, the processor is configured to initiate receiving, from the robot, data representing an elapsed time spent cleaning at least one room and to present the elapsed time in the first graphical representation of an editable mission timeline.

In some implementations, the processor is configured to initiate receiving, from the autonomous cleaning robot, data representing that the autonomous cleaning robot has completed cleaning a room, and to change an appearance of the icon corresponding to the cleaned room in the first graphical representation of the editable mission timeline.

In some implementations, changing the appearance of the icon comprises changing a color, a shape, a size, or a position of the icon.

In some implementations, the processor is configured to determine an area of interest from one or more images captured by the handheld computing device and transmit data representing a cleaning instruction for the area of interest to the robot.

In some implementations, the user-manipulatable icons may be dragged and dropped within the editable mission timeline.

In some implementations, the processor is further configured to initiate transmission of data representing a revised order of icons in the editable mission timeline.

In some implementations, the user-manipulatable icons may be clicked on and removed from the editable mission timeline.

In some implementations, the icons corresponding to cleaned rooms are fixed in the editable mission timeline.

Advantages of the foregoing may include, but are not limited to, those described below in and herein elsewhere. The mission timeline can display an estimated remaining cleaning time to a user. The mission timeline allows the user to remotely manipulate the order in which rooms are to be cleaned by the autonomous cleaning robot. A user may delete, re-order, or add rooms to the cleaning schedule of the cleaning robot on the mission timeline. For example, if a user is having guests over to their home and needs the kitchen, living room, and bathroom cleaned before guests arrive, the user can re-order the cleaning schedule and/or delete rooms except for these rooms such that the cleaning of these rooms is completed in time.

Furthermore, the mission timeline can provide an interface that allows a user to select cleaning parameters for individual rooms and monitor operational events, like detecting dirt, occurring during cleaning. The user interface also includes a map for displaying cleaned rooms and locations of operational events.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

The details of one or more implementations are set forth in the accompanying drawings and the description below. Other features and advantages will be apparent from the description and drawings, and from the claims.

BRIEF DESCRIPTION OF DRAWINGS

FIGS. 6A-6B are screenshots of a user interface showing a cleaning map.

FIG. 7A is a perspective view of a room with a dirty location.

FIG. 7B is a screenshot of a user interface for directing the robot to clean the dirty location.

DETAILED DESCRIPTION

An autonomous cleaning robot may be controlled directly by a user (e.g. by pushing a button on the robot) or remotely (e.g. by a mobile application). A mobile application can be used to change cleaning parameters, scheduling, or a cleaning status of the autonomous cleaning robot. The mobile application may include an editable mission timeline displaying a selection and an order of rooms to be cleaned along with time estimates for completing cleaning in each room. Based on the displayed order and time estimates, a user may change the order or selection of rooms or cleaning parameters for cleaning each room. As the autonomous cleaning robot receives information from the mobile device and executes the cleaning mission summarized on the timeline, operational events and a status of the robot may be sent from the robot to be displayed such that the user can continue to monitor, and change if desired, the cleaning mission.

Figure 1:
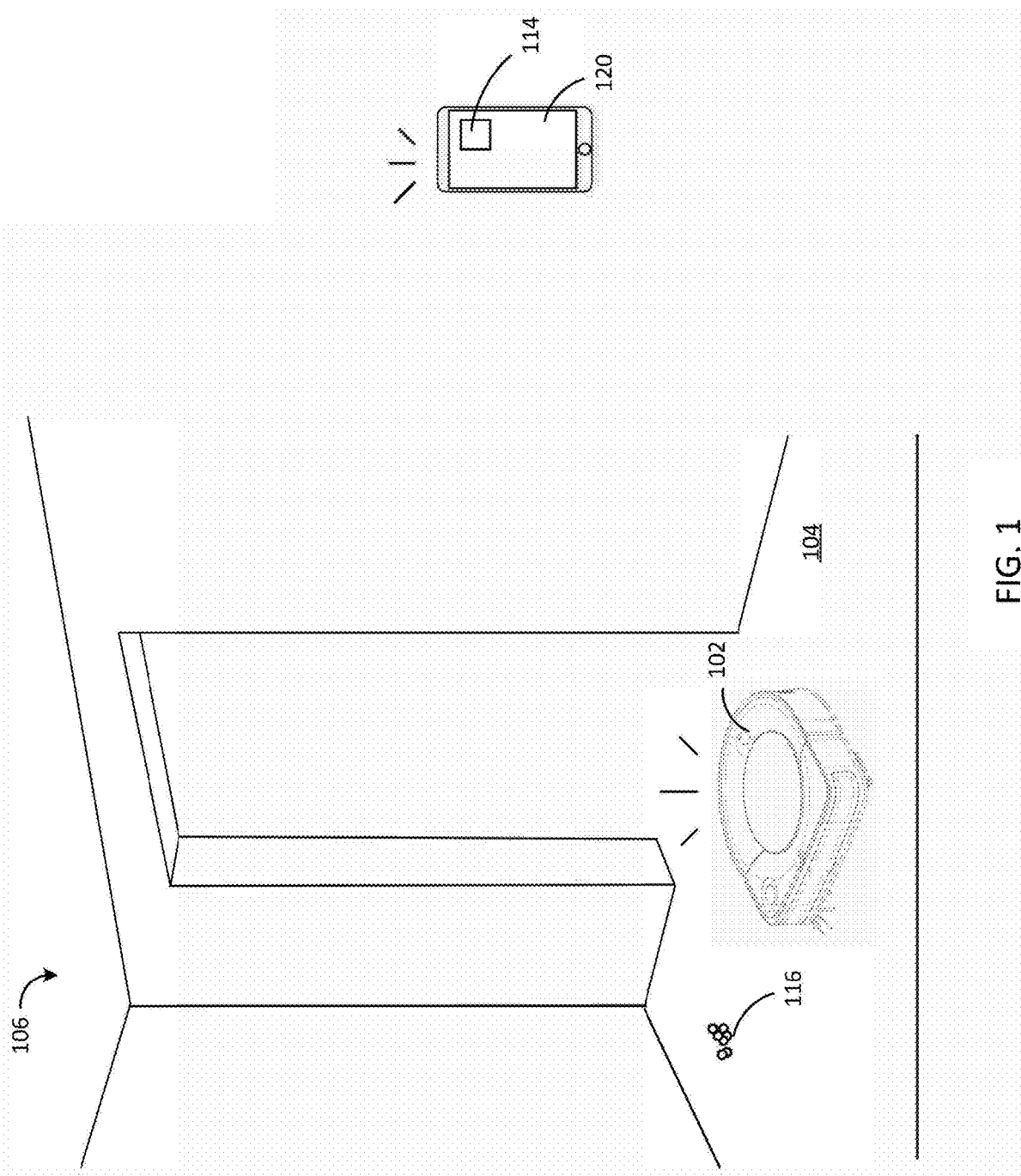
FIG. 1 is a view of a system for controlling an autonomous cleaning robot using a handheld computing device.

Referring to FIG. 1, an autonomous cleaning robot 102 is located on a floor surface 104 within a room 106. The autonomous cleaning robot 102 is configured to communicate with a handheld computing device 120. In some cases, the handheld computing device 120 may be, for example, a smart phone, a tablet, a smart watch, a laptop computer, etc. The handheld computing device 120 includes a processor 114 configured to initiate data transmission and reception with the autonomous cleaning robot 102 (either directly or via the internet) and present a graphical representation of an editable mission timeline. An editable mission timeline is a user-manipulable graphical display showing a sequence of rooms to be cleaned. The timeline can optionally include associated time estimates to clean each space.

The autonomous cleaning robot 102 includes a controller which is configured to receive data representing the editable mission timeline and navigate the autonomous cleaning robot 102 across the floor surface 104 and clean the rooms following the sequence of the mission timeline. For example, the autonomous cleaning robot 102 includes a vacuum assembly 108 and uses suction to ingest debris 116 as the autonomous cleaning robot 102 traverses the floor surface 104. In some implementations the autonomous cleaning robot 102 may be a mopping robot which may include a cleaning pad for wiping or scrubbing the floor surface 104. In some implementations, it can be desirable to have a single interface that can be used to coordinate the activities of multiple robots and more than one autonomous cleaning robot may communicate with the handheld computing device 120.

Figure 2:
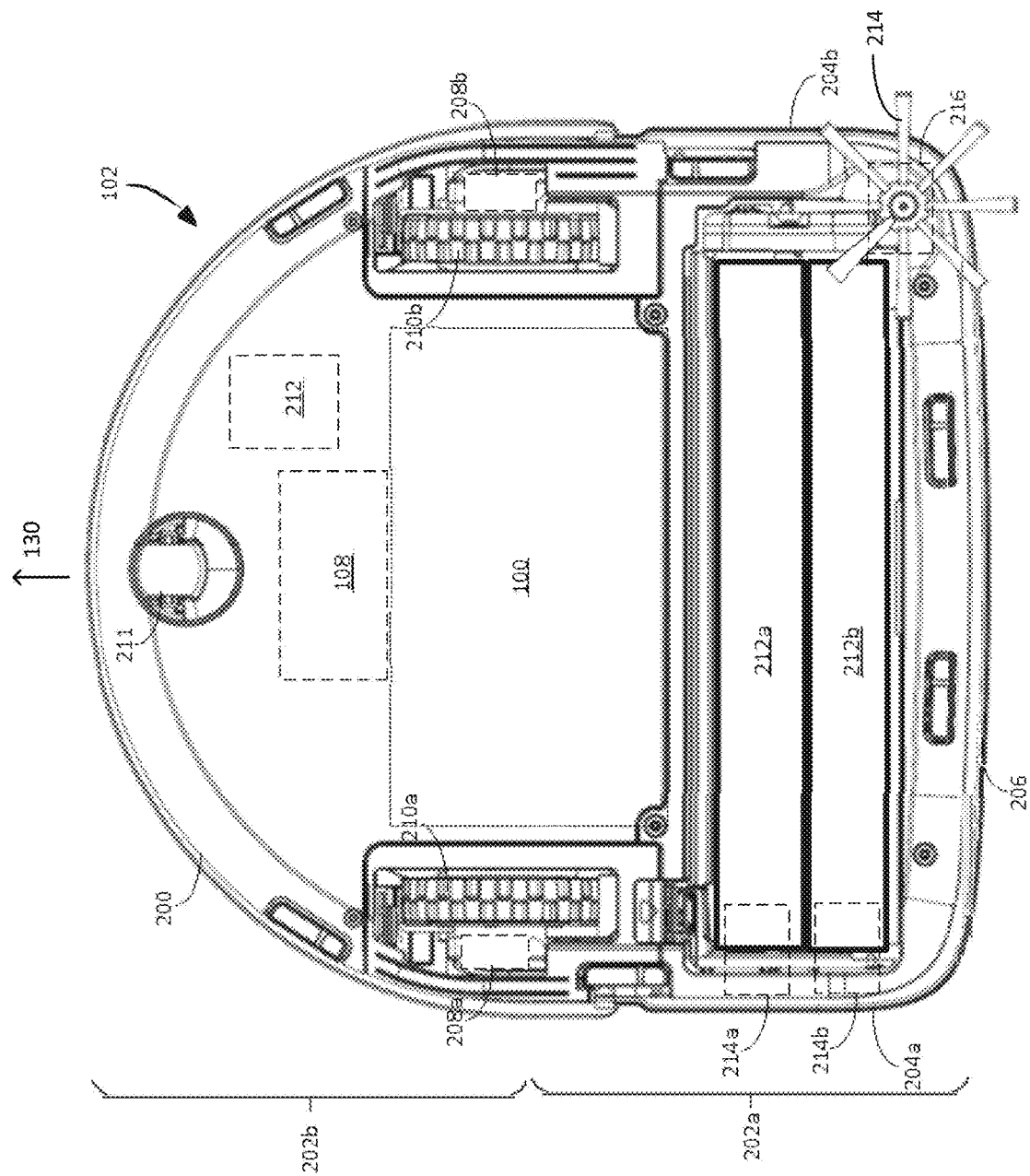
FIG. 2 is a view of an underside of an embodiment of an autonomous cleaning robot.

Referring to FIG. 2, the robot 102 includes a body 200 movable across the floor surface 104 and is powered by a battery. As shown in FIG. 2, in some implementations, the body 200 includes a front portion 202a that has a substantially rectangular shape and a rear portion 202b that has a substantially semicircular shape. The front portion 202a includes, for example, two lateral sides 204a, 204b that are substantially perpendicular to a front side 206 of the front portion 202a.

The robot 102 includes a drive system including actuators 208a, 208b mounted in the body 200 and operably connected to the drive wheels 210a, 210b, which are rotatably mounted to the body 200. The robot 102 includes a controller 212 that operates the actuators 208a, 208b to autonomously navigate the robot 102 about a floor surface 104 during a cleaning operation. In some implementations, the robot 102 includes a caster wheel 211 that supports the body 200 (e.g. the rear portion 202b of the body 200) above the floor surface 104, and the drive wheels 210a, 210b support the front portion 202a of the body 200 above the floor surface 104.

A vacuum assembly 108 is also carried within the body 200 of the robot 102, e.g., in the rear portion 202b of the body 200. The controller 212 operates the vacuum assembly 108 to generate the airflow 110 and enable the robot 102 to ingest the debris 116 during the cleaning operation. The airflow 110 generated by the vacuum assembly 108 is exhausted through a vent 213 in a rear portion 202b or a conduit connected to a cleaning head of the robot 102. The cleaning head includes, for example, one or more rollers (e.g. brushes or compliant rubber rollers) that engage the floor surface 104 and sweep the debris 116 into the cleaning bin 100. The airflow 110 exhausted to the cleaning head can further improve pickup of debris from the floor surface 104 by increasing an amount of airflow proximate the cleaning head to agitate the debris 116 on the floor surface 104.

In some cases, the cleaning robot 102 is a self-contained robot that autonomously moves across the floor surface 104 to ingest debris. The cleaning robot 102, for example, carries a battery to power the vacuum assembly 108. In the example depicted in FIGS. 1 and 2, the cleaning head of the robot 102 includes a first roller 212a and a second roller 212b. The rollers 212a, 212b include, for example, brushes or flaps that engage the floor surface 104 to collect the debris 116 on the floor surface 104. The rollers 212a, 212b, for example, counter rotate relative to one another to cooperate in moving debris 116 toward a plenum 112, e.g., one roller rotates counterclockwise while the other rotates clockwise. The plenum 112 in turn guides the airflow 110 containing the debris 116 into the cleaning bin 100. As described herein, during the travel of airflow 110 through the cleaning bin 100 toward the vacuum assembly 108, the debris 116 is deposited in the cleaning bin 100.

In some implementations, to sweep debris 116 toward the rollers 212a, 212b, the robot 102 includes a brush 214 that rotates about a non-horizontal axis, e.g., an axis forming an angle between 75 degrees and 90 degrees with the floor surface 104. The brush 214 extends beyond a perimeter of the body 200 such that the brush 214 is capable of engaging debris 116 on portions of the floor surface 104 that the rollers 212a, 212b typically cannot reach. In particular, the brush 214 is capable of engaging debris 116 near walls of the environment and brushing the debris 116 toward the rollers 212a, 212b to facilitate ingestion of the debris 116 by the robot 102.

The user can control the robot directly by pushing a button on the robot or can control the robot remotely via a mobile application on a mobile device. Through the mobile application, the user can modify when and where the robot cleans. In response to a signal from the mobile device, the autonomous cleaning robot 102 navigates the home executing cleaning behaviors, while monitoring its status and transmitting status data to the mobile device.

Figure 3:
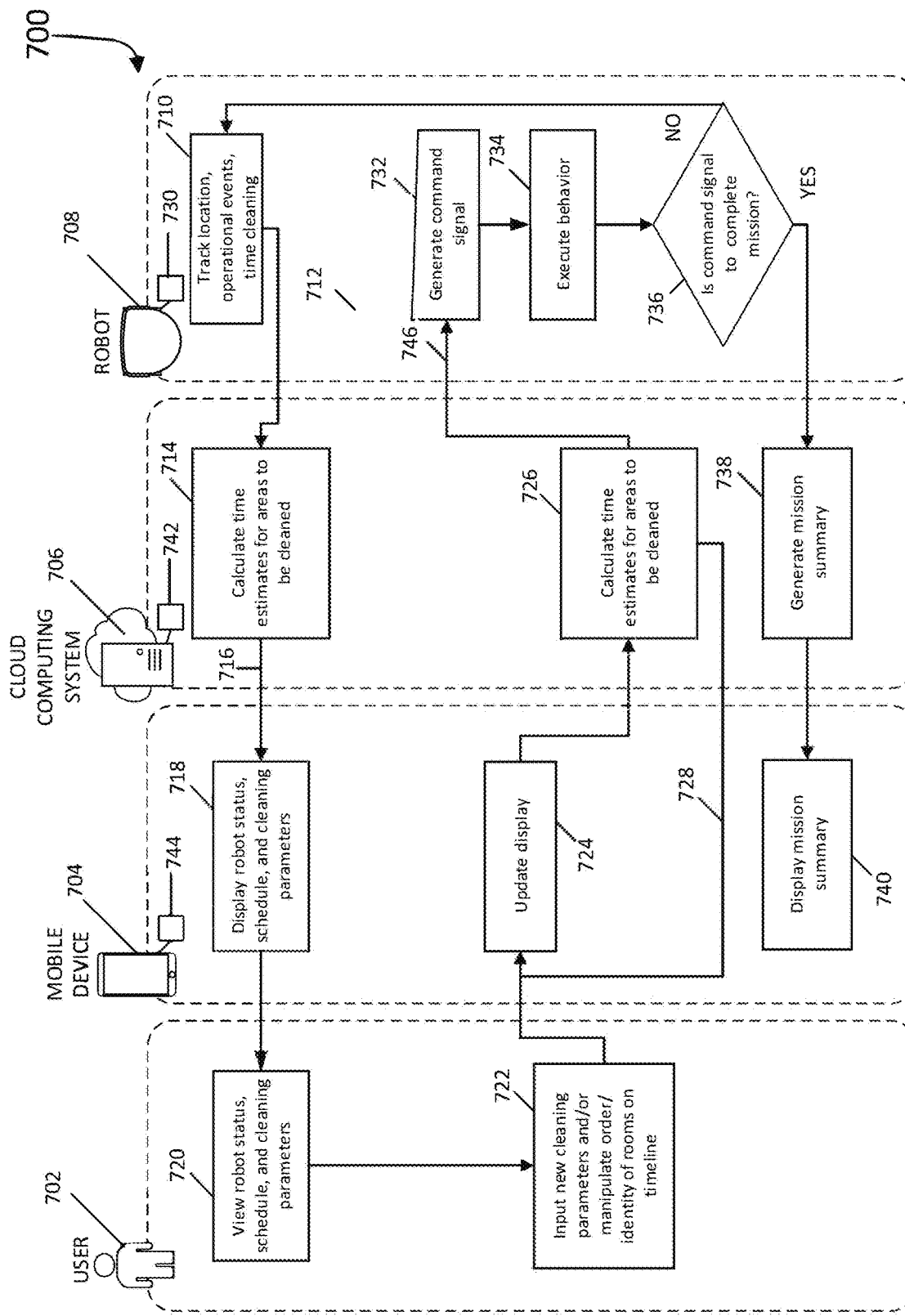
FIG. 3 is a flow chart depicting a process to transmit data between a user interface and an autonomous cleaning robot.

FIG. 3 is a flow chart depicting a process of exchanging information among an autonomous mobile robot, a cloud computing system, and a mobile device. A cleaning mission may be initiated by pressing a button on the robot 708 or may be scheduled for a future time or day. The user may select a set of rooms to be cleaned during the cleaning mission or may instruct the robot to clean all rooms. The user may also select a set of cleaning parameters to be used in each room during the cleaning mission.

During a cleaning mission, the autonomous cleaning robot 708 tracks (710) its status, including its location, any operational events occurring during cleaning, and a time spent cleaning. The autonomous cleaning robot 708 transmits (712) status data (e.g. one or more of location data, operational event data, time data) to a cloud computing system 706, which calculates (714), by a processor 742, time estimates for areas to be cleaned. For example, a time estimate could be calculated for cleaning room 106 by averaging the actual cleaning times for the room that have been gathered during multiple (e.g. two or more) prior cleaning missions for the room. The cloud computing system 706 transmits (716) time estimate data along with robot status data to a mobile device 704. The mobile device 704 presents (718), by a processor 744, the robot status data and time estimate data on a display. The robot status data and time estimate data may be presented on the display of the mobile device as any of a number of graphical representations editable mission timeline and/or a mapping interface (as shown in FIGS. 4A-4H, 5, and 6A-6B).

A user 702 views (720) the robot status data and time estimate data on the display and may input (722) new cleaning parameters or may manipulate the order or identity of rooms to be cleaned. The user 702, may, for example, delete rooms from the robot's 708 cleaning schedule. In other instances, the user 702, may, for example, select an edge cleaning mode or a deep cleaning mode for a room to be cleaned. The display of the mobile device 704 is updates (724) as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 702, the cloud computing system 706 calculates (726) time estimates for areas to be cleaned, which are then transmitted (728) (e.g. by a wireless transmission, by applying a protocol, by broadcasting a wireless transmission) back to the mobile device 704 and displayed. Additionally, data relating to the calculated (726) time estimates are transmitted (746) to a controller 730 of the robot. Based on the inputs from the user 702, which are received by the controller 730 of the robot 708, the controller 730 generates (732) a command signal. The command signal commands the robot 708 to execute (734) a behavior, which may be a cleaning behavior. As the cleaning behavior is executed, the controller continues to track (710) the robot's status, including its location, any operational events occurring during cleaning, and a time spent cleaning. In some instances, live updates relating to the robot's status may be additionally provided via push notifications to a mobile device or home electronic system (e.g. an interactive speaker system).

Upon executing (734) a behavior, the controller 730 checks (736) to see if the received command signal includes a command to complete the cleaning mission. If the command signal includes a command to complete the cleaning mission, the robot is commanded to return to its dock and upon return sends information to enable the cloud computing system 706 to generate (738) a mission summary which is transmitted to, and displayed (740) by, the mobile device 704. The mission summary may include a timeline and/or a map. The timeline may display, the rooms cleaned, a time spent cleaning each room, operational events tracked in each room, etc. The map may display the rooms cleaned, operational events tracked in each room, a type of cleaning (e.g. sweeping or mopping) performed in each room, etc.

Operations for the process 700 and other processes described herein can be executed in a distributed manner. For example, the cloud computing system 706, the mobile robot 708, and the mobile device 704 may execute one or more of the operations in concert with one another. Operations described as executed by one of the cloud computing system 706, the mobile robot 708, and the mobile device 704 are, in some implementations, executed at least in part by two or all of the cloud computing system 706, the mobile robot 708, and the mobile device 400.

Figures 4A, 4B:
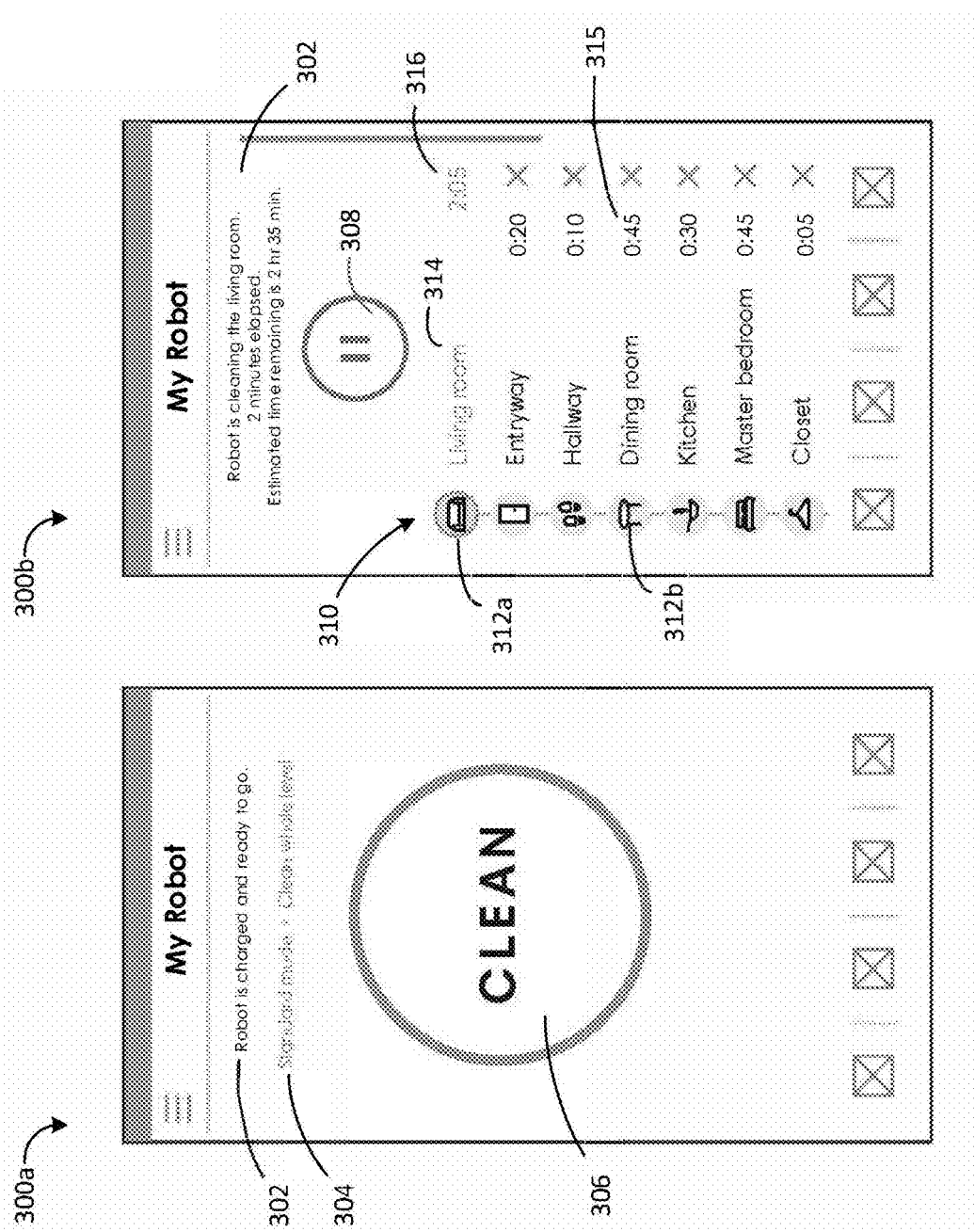
FIGS. 4A-4H are screenshots of an embodiment of a user interface for controlling an autonomous cleaning robot including an editable timeline.

FIGS. 4A-4H are screenshots of an embodiment of a user interface for controlling an autonomous cleaning robot including an editable timeline. Referring to FIG. 4A, the user interface 300a includes a status indicator 302 and a cleaning mode indicator 304. The status indicator 302 indicates a current status of the autonomous cleaning robot 102. A cleaning mode indicator 304 may indicate an overall cleaning mode to be used during the cleaning mission. A cleaning mode may be, for example, a standard cleaning mode, a deep cleaning mode, a quick cleaning mode, etc. The user interface 300a also includes a clean button 306 which the user may select to start a cleaning mission for the autonomous cleaning robot 102.

Referring to FIG. 4B, the user interface 300b displays, during a cleaning mission, the status indicator 302, a pause button 308, and an editable mission timeline 310. During a cleaning mission, the status indicator 302 includes the current location of the autonomous cleaning robot 102, an elapsed time, and an estimated time remaining in the cleaning session. The robot sends information about a current cleaning time and location. This information is used to generate the information included in the status indicator. The elapsed time and remaining time are displayed in the status indicator. The elapsed time and remaining time in the status indicator are associated with the full cleaning mission (e.g. how long the robot has been cleaning in total for the mission and how long expected to clean all remaining areas on the schedule). The pause button 308 allows the user to pause the cleaning session. The editable mission timeline 310 includes room icons 312, room labels 314, room cleaning time estimates 315, and elapsed cleaning times 316. As the autonomous cleaning robot 102 cleans a room, the user interface 300 displays an elapsed cleaning time 316 for that room adjacent to the room label 314. A room cleaning time estimate 315 is displayed in the editable mission timeline 310 to inform a user of an approximate time to clean the corresponding room. The time estimates 315 may be based on, for example, data received from the robot from previous cleaning missions, an input of approximate square footage of the space to be cleaned, a test run through all rooms for purposes of calculating time estimates, etc. Based on these time estimates 315, a user may find it desirable to re-order or remove rooms from the cleaning schedule represented by the editable mission timeline 310.

Upon completion of cleaning in one space and beginning to clean in another, the robot sends information about the time and new location to the cloud computing system and the cloud computing system sends information to the mobile device to update the displayed timeline. For example, the data can cause the mobile device to update the timeline to highlight the current space and provide the total time spent cleaning the prior space, replacing the previously provided estimate.

The icons 312 are user-manipulatable (e.g. by dragging and dropping) using an input device, for example, a touch screen of the handheld computing device 120 on which the user interface 300b is displayed. As such, the user can easily re-order or remove rooms from the cleaning schedule while the autonomous cleaning robot 102 is cleaning. When the user reorders or removes a room or space from the schedule, information is sent to the robot to adjust the robot's schedule accordingly to remove or reorder the cleaning operations. In some implementations, the icons 312 may be selectable by the user and allow the user to select one or more cleaning parameters for the corresponding room. A cleaning parameter may be, for example, a vacuum power level, a single versus a multiple pass setting, an edge cleaning setting, a wet versus dry cleaning setting, etc. When the user selects a new cleaning parameter or changes an existing cleaning parameter, information is sent to the robot to adjust the robot's cleaning parameters accordingly to add or change the cleaning parameter for at least a portion of the cleaning mission.

Figures 4C, 4D:
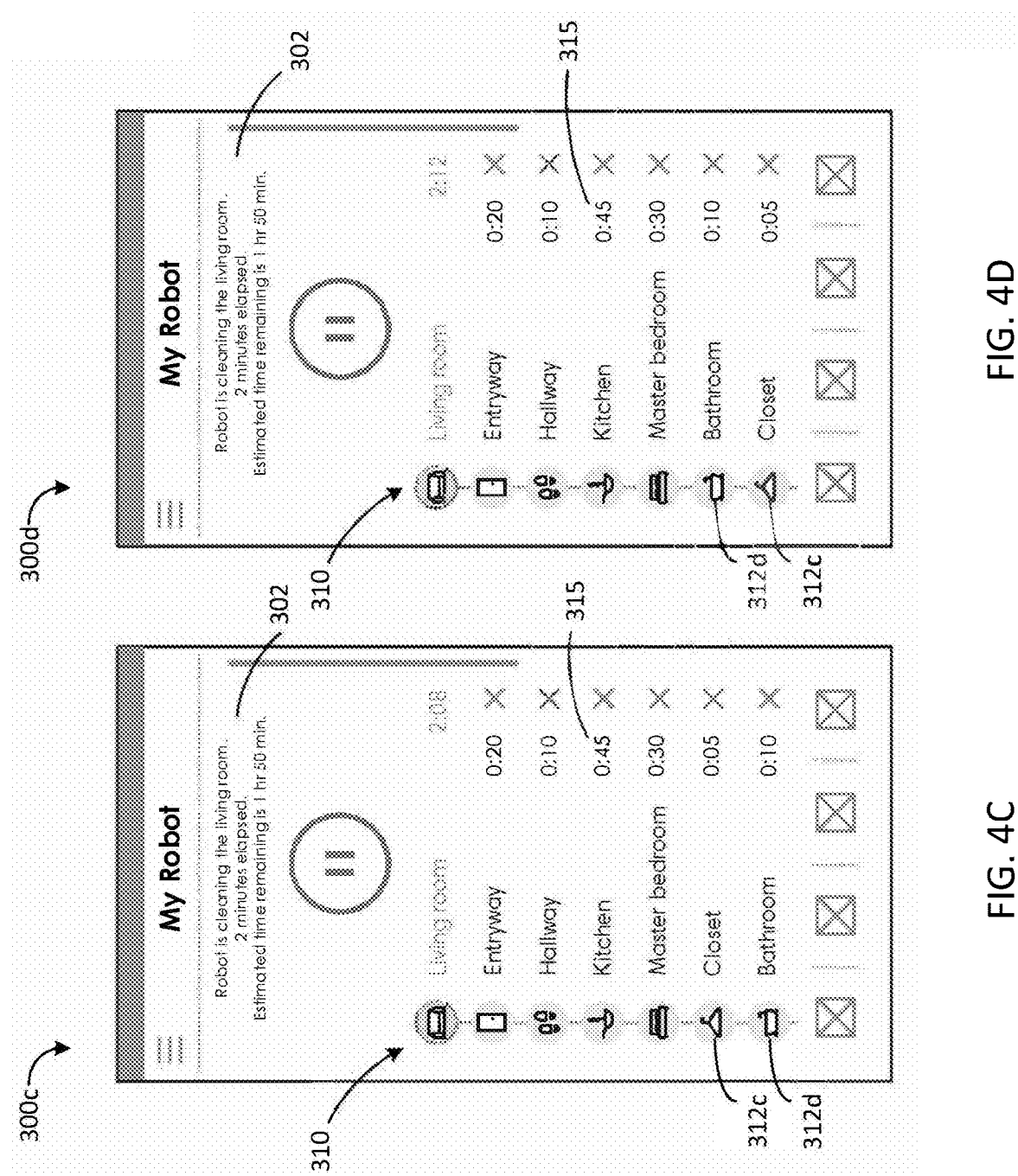

Referring to FIG. 4C, the user interface 300c shows the editable mission timeline 310 where the icon 312b, representing the dining room, has been deleted by the user. For example, the user can select the icon of the "X" to remove the room. Upon selection, the mobile device sends information to the cloud computing system and the cloud computing system calculates a new total time to completion. The cloud computing system sends the updated time to cause the mobile device to present, on the display, the new schedule. The cloud computing system also sends, and the robot receives, information to cause the robot to adjust its cleaning routine to skip the dining room. The remaining time estimate displayed in the status indicator 302 is updated to reflect the deletion of the dining room's estimated cleaning time. For example, here, the removal of the dining room icon 312b from the editable mission timeline 310, reduces the overall cleaning estimate by 45 minutes. A user may delete room icons 312 from the editable mission timeline 310 to shorten the overall cleaning time or to focus a cleaning mission in particular rooms. This may also be desirable if the user has a deadline for cleaning, for example, having guests over, or would like to be able to complete the cleaning mission on no more than one charge of a battery of the cleaning robot 102.

Referring to FIG. 4D, the user interface 300d shows the editable mission timeline 310 where the icons 312c and 312d, corresponding to the closet and bathroom, respectively, have been re-ordered compared to the order shown in FIG. 4C. As such information is sent from the mobile device and received by the robot to cause the controller 212 of the autonomous cleaning robot 102 will instruct the autonomous cleaning robot 102 to clean the bathroom before cleaning the closet.

Figures 4E, 4F:
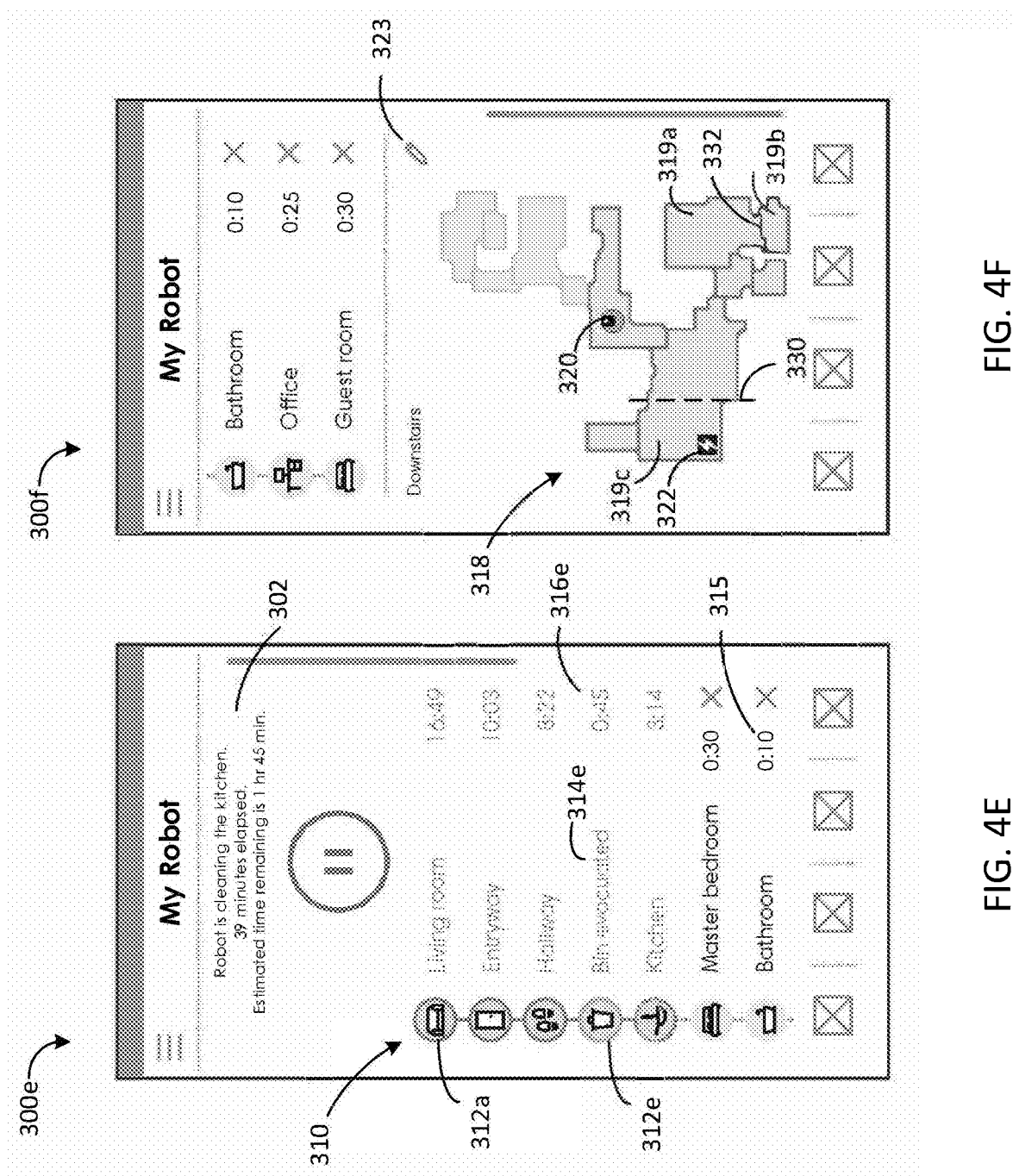

Referring to FIG. 4E, the user interface 300e shows an icon 312e corresponding to an operational event, here a bin evacuation event (e.g. when the robot docks and an evacuation unit removes the dirt and debris in the robot's dust bin into a collection volume or bag of the evacuation unit). The icon 312e informs the user that while the autonomous cleaning robot 102 was in the room corresponding to the icon directly above the operational event icon 312e, the operational event occurred. In this example, the robot determines that the dust bin is full or near its full capacity. The robot then traverses the floor to find the docking station or evacuation unit. Upon locating the unit, the dust bin is evacuated (emptied) and the robot sends a signal to the cloud computing system. The cloud computing system sends information to cause the mobile device to display the indicator. After evacuation, the robot returns to clean the next room or space on the schedule. An operational event label 314e and an elapsed time 316e are also included in the editable mission timeline 310 informing the user of a description of the operational event and the associated time to resolve it. In the example of bin evacuation, the time information sent from the robot to be displayed can be either a time spent to complete the bin evacuation or a time to drive the robot to the evacuation station, evacuate the bin, and drive the robot back to the cleaning location. In some examples, the robot is controlled to complete the room it is currently cleaning prior to evacuating the bin. An operational event icon 312e may be displayed in a different shape, color, outline, etc., from the room icons 312a-312d. Additionally, icons representing rooms that have been completed, here 312a corresponding to the living room, may be displayed in a different shape, color, outline, etc. from rooms remaining to be cleaned. In some implementations, errors may also be included in the mission timeline 310. An icon, an error label, and an elapsed time may be shown to describe the error.

Referring to FIG. 4F, the user interface 300f (which may, in some examples be reached by scrolling down from interface 300e shown in FIG. 4E) also includes a graphical representation of a map 318 of a floor plan of an area to be cleaned. The floorplan is split into rooms 319. Rooms 319 that have been cleaned may be displayed in a different color, outline, fill pattern, etc. from rooms remaining to be cleaned. The map 318 also includes a robot icon 320 representing the location of the autonomous cleaning robot 102. The robot icon 320 is moved within the map 318 as the autonomous cleaning robot 102 moves through the rooms to be cleaned. As the robot moves through the rooms or spaces on the schedule, information relating to the robot's position and cleaning status are sent to the cloud computing system. The cloud computing system sends information to cause the mobile device to display the robot icon 320 on the map 318 in a location corresponding to the robot's location. The cloud computing system also sends information to cause the mobile device to display the rooms 319 based on the robot's cleaning status (e.g. if the robot's cleaning status indicates that cleaning a room has been completed, the room may be colored differently from rooms in progress or remaining to be cleaned).

The map also includes a dock icon 322 corresponding to the location of a charging dock for the autonomous cleaning robot 102. The map 318 includes a pencil icon 323 which, when selected, allows a user to draw on a portion of the map 318. In some implementations, the user may draw on the map 318 to split areas on the map 318 into separate rooms. For example, a user may draw along dotted line 330 to split room 319c into two separate rooms. When rooms are split, the user may be prompted to select an icon and/or a name for the split rooms. The user may also be prompted to select cleaning parameters to be used in cleaning the split rooms. In some implementations, the user may select a boundary between rooms on the map 318 to merge rooms together into one room. For example, a user may select boundary 332 between rooms 319a and 319b to merge the rooms 319a and 319b into one room. When rooms are merged, the user may be prompted to select an icon and/or a name for the merged room. The user may also be prompted to select cleaning parameters to be used in cleaning the merged room.

Figures 4G, 4H:
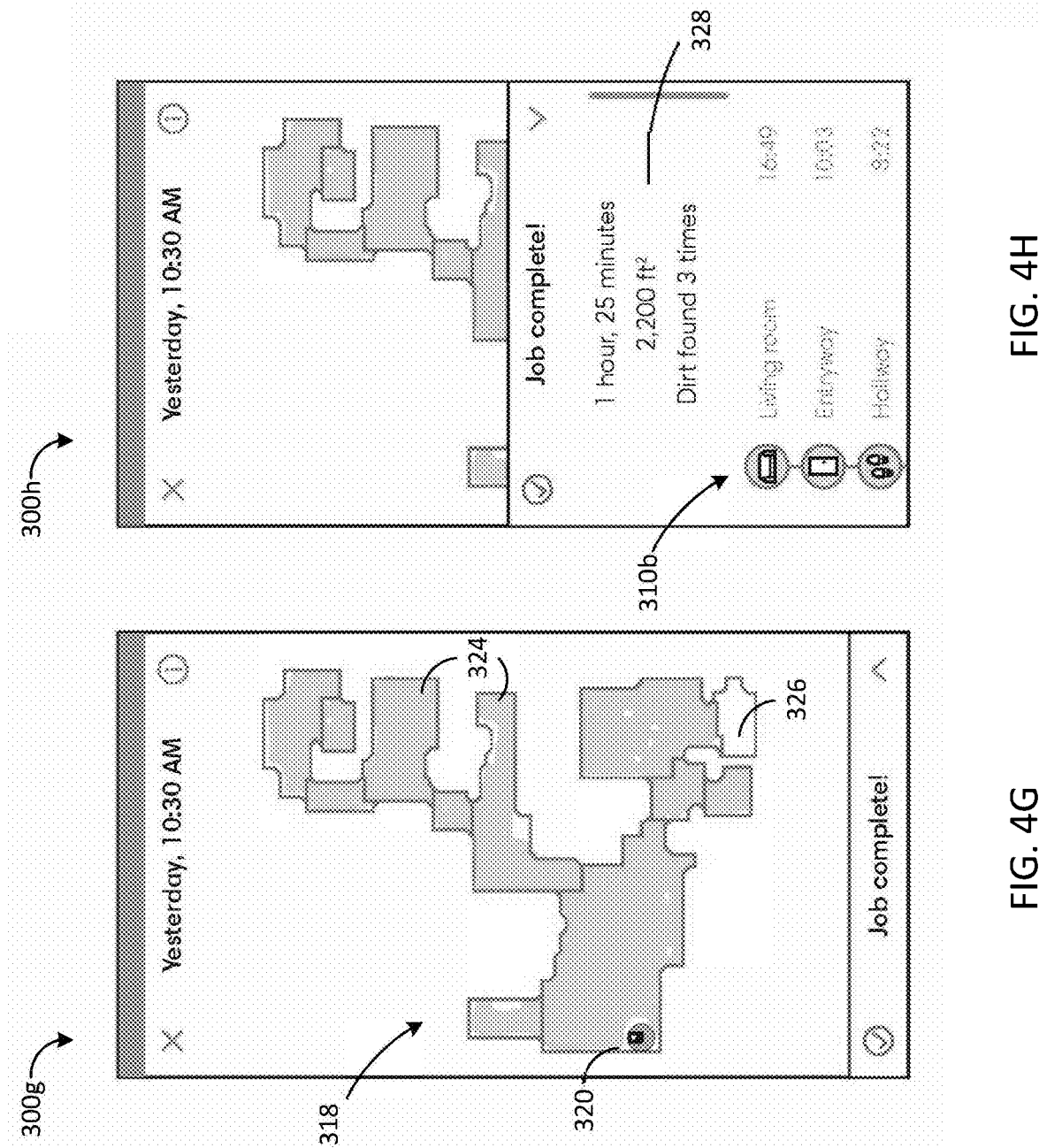

In some implementations, the user may draw on the map to indicate that the area indicated requires additional cleaning. The mobile device sends information relating to the area requiring additional cleaning (e.g. a location of the area, cleaning parameters to be followed) to the cloud computing system and the cloud computing system sends the information to the robot. The controller generates a command signal to clean the area based on the transmission from the cloud computing system and the robot cleans the area according to the specified cleaning parameters. In some implementations, the additional cleaning may be added to the cleaning schedule and performed after the robot completes other scheduled cleaning in the cleaning mission. Scheduling the additional cleaning may be performed by the cloud computing system, the controller, or by the user by using the mobile device. In some implementations, the map 318 could also include indicators for differing floor types or for locations of thresholds within the area to be cleaned. Referring to FIGS. 4G and 4H, the user interfaces 300g and 300h include a graphical representation of a map 318 which displays cleaned rooms 324 and uncleaned room 326 to summarize a completed cleaning mission. The map 318 also displays a robot icon 320 representing the location of the autonomous cleaning robot 102. The user interface 300 also displays a cleaning summary 328 which includes the total cleaning mission time, a measurement for the area cleaned (e.g. a number of rooms, a square footage, area measurement, etc.), and a summary of dirt detect events. The summary of dirt detect events may include information relating to locations where the robot detected excess dirt. For example, a summary of dirt detect events may be displayed as indicators on a map interface with each dirt detect event corresponding to an indicator located in a room on the map corresponding to the room (or location within a room) where excess dirt was detected. In another example, a summary of dirt detect events may be displayed as icons on a post-completion mission timeline with each dirt detect event corresponding to an icon associated with a room icon on the post-completion mission timeline. A mission timeline 310b is also included with the cleaning summary 328 and provides a summary of the order of rooms cleaned and the time spent cleaning each room. In some implementations, this post-completion mission timeline 310b is not editable, as the cleaning mission is completed. In some implementations, the mission timeline 310b is editable such that the user can modify the order or selection of rooms to be cleaned and save the order to be used in a subsequent cleaning mission.

Figure 5:
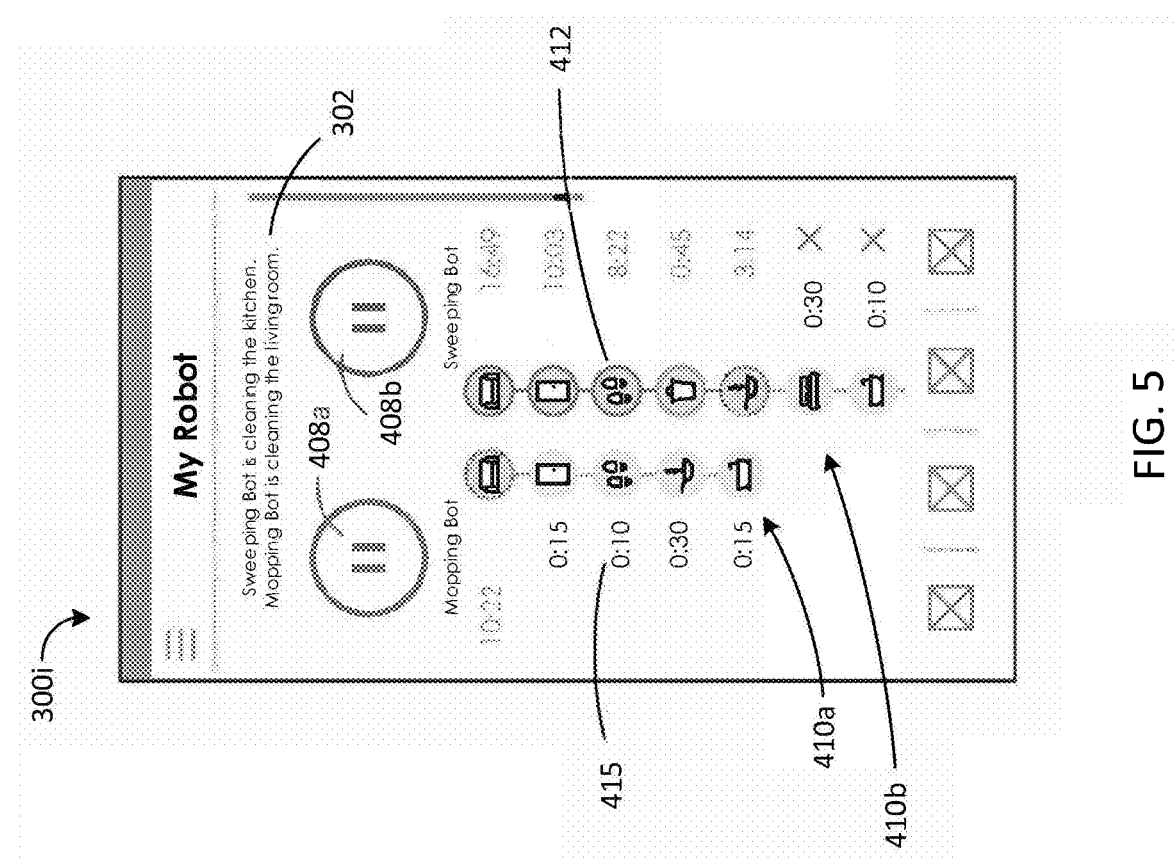
FIG. 5 is a screenshot of an embodiment of a user interface for controlling multiple autonomous cleaning robots.

Referring to FIG. 5, a user interface 300i may include a first editable mission timeline 410a and a second editable mission timeline 410b with each of the editable mission timelines corresponding to different autonomous cleaning robots. For example, editable mission timeline 410a represents a cleaning mission for a mopping robot and editable mission timeline 410b represents a cleaning mission for a sweeping robot. The editable mission timelines 410a and 410b also include a predicted time 415 for cleaning each room. The predicted times may be computed by averaging the actual cleaning times for the room that have been gathered during multiple (e.g. two or more) prior cleaning missions for the room. The predicted times can be updated as the robot progresses through the cleaning mission or as cleaning parameters or the sequence of rooms to be cleaned are adjusted.

The icons 412 may be manipulated by a user to change the sequence of cleaning the rooms in the mission by rearranging, or deleting, the icons. When the user reorders or removes a room or space from the schedule, information is sent to the robot to adjust the robot's schedule accordingly to remove or reorder the cleaning operations. Upon selection of one of the icons 412, the mobile device sends information to the cloud computing system and the cloud computing system calculates a new total time to completion. The cloud computing system sends the updated time to cause the mobile device to present, on the display, the new schedule. The cloud computing system also sends, and the robot receives, information to cause the robot to adjust its cleaning routine.

The icons 412 may be selectable by the user and allow the user to select one or more cleaning parameters for that room. A cleaning parameter may be, for example, a vacuum power level, a single versus a multiple pass setting, an edge cleaning setting, a wet versus dry cleaning setting, etc. When the user selects a new cleaning parameter or changes an existing cleaning parameter, information is sent to the robot to adjust the robot's cleaning parameters accordingly to add or change the cleaning parameter for at least a portion of the cleaning mission. Upon selection of one of the icons 412, the mobile device sends information to the cloud computing system and the cloud computing system calculates a new total time to completion. The cloud computing system also calculates new estimated completion times for each room on the mission timeline and transmits the new estimates to the mobile device for presentation on a display.

The timelines 410a and 410b may be configured such that each room to be cleaned by the mopping robot, the rooms in timeline 410b, is cleaned by the sweeping robot before the mopping robot cleans the room. In some implementations, the processor 114 is configured to order the rooms in the timelines 410a and 410b such that each room is cleaned by the sweeping robot before it is cleaned by the mopping robot. For example, the estimated time of completing sweeping the kitchen by the sweeping robot must be before the estimated time for the mopping robot to begin mopping the kitchen. In some implementations, cleaning patterns of a sweeping robot and a mopping robot may be coordinated such that the sweeping and mopping robot may simultaneously clean the same room, however the mopping robot only mops portions of the room that have been previously swept by the sweeping robot. In some implementations, the processor 114 is configured to only include rooms with hard floor surfaces (e.g. tile, hardwood, laminate, etc.) in the timeline 410a for the mopping robot. Pause buttons 408a and 408b may be used to pause a cleaning mission for the mopping robot and the sweeping robot, respectively. When either of the pause buttons 408a or 408b are selected, a signal is sent to the corresponding cleaning robot to suspend cleaning.

In some implementations, the timelines 410a and 410b may correspond to two robots configured to perform similar cleaning tasks (e.g. two sweeping robots). In such situations, the timelines 410a and 410b may be generated based on the rooms selected to be cleaned. For example, timeline 410a for a first robot may include icons corresponding to rooms on an upper floor of a home whereas timeline 410b for a second robot may include icons corresponding to rooms on a lower floor of a home. In another implementation, the timelines 410a and 410b may be generated to minimize an estimated cleaning time of the rooms selected to be cleaned. For example, if the two robots performing the cleaning have docks that are located on opposite sides of a home, the timelines may select rooms nearby to each robot's dock to be included in that robot's timeline.

In some implementations, a user may configure and save custom cleaning mission plans for multiple robots. For example, a user may save a "high traffic" cleaning mission plan which selects the kitchen and living room to be cleaned by one robot and the master bedroom and hallway to be cleaned by a second robot. When this "high traffic" cleaning plan is selected, the mission timelines for the first robot and the second robot are generated based on the rooms chosen for each in the cleaning plan.

Referring to FIGS. 6A and 6B, the user interfaces 300j and 300k present a map 518 including robot icons 520a and 520b, corresponding to locations of the mopping and sweeping robots, respectively (both based on information received from the robot). The map 518 displays cleaned areas 524 and uncleaned areas 526 based on data received from the cleaning robots during the cleaning mission. The map 518 also displays swept and mopped areas 530 where both the sweeping robot and the mopping robot cleaned the floor surface. Different colors or shading styles may be used to show different types of cleaning (e.g. sweeping and mopping). For example, in FIG. 6A, the solid shading of cleaned areas 524 and 530 represent swept areas and the diagonal line shading of area 530 represents mopped areas. Symbols 531 are included on the map 518 to show locations where the cleaning robot performed extra cleaning because excess dirt was detected in that area during the cleaning mission. As the robot cleans, if the robot detects dirt, the robot performs additional cleaning and sends information relating to the additional cleaning to the cloud computing system. The cloud computing system sends the information to the mobile device, which presents a location of the additional cleaning on the display of the mobile device. The mobile device may present the location as a symbol on a map or as an icon on a mission timeline. At the end of a cleaning mission, the user interface 300 may display a cleaning summary including a total elapsed time 532 for completing the cleaning mission, a number of dirt events (e.g. areas where the robot performed additional cleaning because excess dirt was detected in that area during the cleaning mission) detected 534, and a graphical representation 536 showing the time spent cleaning and the time spent charging the autonomous cleaning robot 102. In some instances, an animation including a play/pause toggle may be included to show a sped-up animation of the mission including cleaning progress and the location and timing of operational events that occurred during the mission. In some instances, selecting an icon on the mission timeline may cause the mapping interface to be displayed to show progress of the robot to the point in the mission represented by the icon.

In some implementations, an optimized charge and resume function may be included. The optimized charge function would compare the estimated time remaining in a cleaning run to the estimated remaining charge of a battery of the autonomous cleaning robot. In some implementations, the type of cleaning to be done in each room (e.g. edge cleaning, high power vacuum, etc.) may be evaluated to estimate how much of the cleaning could be completed on the autonomous cleaning robot's remaining battery. The optimized charge function can direct the robot to stop cleaning and charge for a set time period before finishing the cleaning mission. For example, the autonomous cleaning robot may have 45 minutes of cleaning remaining, but only 20 minutes of battery charge. In order to complete the cleaning mission in the least amount of elapsed time, the optimized charge function would command the robot to stop cleaning and charge for a set time period which would fill the battery enough to clean for the remaining 45 minutes of the cleaning mission, but not up to a full charge. For example, charging the battery for an extra 25 minutes of cleaning may only take 15 minutes, whereas charging a battery all the way full may take an hour. As such, the optimized charge would allow the autonomous cleaning robot to finish the cleaning mission 45 minutes earlier than if it charged to a full battery.

Referring to FIGS. 7A and 7B, FIG. 7A is a perspective view of a room 106 with debris 116 on the floor surface 104. A user, using a handheld computing device, like the mobile phone 600 shown in FIG. 7B, may take a photo of the debris 116 on the floor surface 104. A circle 602 is displayed on a screen of the mobile phone 600. The user may position the circle 602 to surround the debris 116. In some implementations, the circle 602 may also be stationary on the screen and the user would move the mobile phone 600 such that the debris 116 is positioned within the circle. In some implementations, a user may draw, (e.g. by using a touch screen) a boundary around the debris 116.

Photographs taken by the user are analyzed by a processor of the mobile device 600 or the cloud computing system (the images are sent by the mobile device to the cloud computing system for analysis) using an image recognition protocol. The image recognition protocol compares the photographs taken by the user of the debris 116 on the floor surface 104 to reference images. The reference images may be images taken by a camera located on the robot. Based on features of the room in the photographs, for example a boundary between a wall 604 and the floor surface 104, or a position of a vent 606, the processor can locate the debris 116 within a room. The processor can mark the locations with debris 116 for additional cleaning during a next cleaning mission. The processor can send information relating to the areas marked for additional cleaning (e.g. a location of the area, a type of additional cleaning to perform) to the robot via the cloud computing system. The additional cleaning may include multiple passes over the area, edge cleaning, or spot cleaning. During a cleaning mission, the additional cleaning may be displayed on an editable mission timeline as discussed in FIGS. 4A-4F. Additionally or alternatively, the additional cleaning may be presented on a graphical representation of a map as shown in FIGS. 6A-6B. Additional cleaning that has been requested via photographs taken by the user may be marked with a different symbol than the symbol 531 used to show where additional cleaning was performed based on excess dirt being detected during the cleaning run.

A mobile device as described herein may include a smart phone, a cellular phone, personal digital assistant, laptop computer, tablet, smart watch, or other portable computing device capable of transmitting and receiving signals related to a robot cleaning mission. The mobile device as described herein is configured to present, on a display, information relating to a robot cleaning mission and receive an input from a user.

A cloud computing system as described herein is a computing system external to the mobile device and to the robot that provides computing processing resources as required within the scheduling and control system. The cloud computing system is configured to receive and transmit signals between the mobile device and the controller of the robot and is configured to process data received from either the mobile device or the controller of the robot.

Operations associated with implementing all or part of the object detection techniques described herein can be performed by one or more programmable processors executing one or more computer programs to perform the functions described herein. For example, the mobile device, the cloud computing system, and the robot's controller may all include processors programmed with computer programs for executing functions such as transmitting signals, computing time estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and scheduling techniques described herein may be applicable to controlling other mobile robots aside from cleaning robots. For example, a lawn mowing robot or a space-monitoring robot may be scheduled to perform operations in specific portions of a lawn or space as described herein. A user could similarly monitor and/or manipulate the mission progress of these robots through a mission timeline and/or mapping interface presented on a mobile device.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A method comprising:
presenting, on a user interface of a mobile device, a first room label in a first position of a list of room labels and a second room label in a second position of the list of room labels, wherein the list of room labels represents a list of rooms to be cleaned by a mobile cleaning robot during execution of a single cleaning mission, wherein one or more attributes of the list of room labels is representative of a status of the single cleaning mission during the single cleaning mission, and wherein the position of each of the first room label and the second room label on the list of room labels is adjustable by a user of the mobile device; and
sending, to the mobile cleaning robot, data indicative of the first room label, the second room label, and the position of each of the first room label and the second room label on the list of room labels, wherein the relative position of the first room label and the second room label on the list determines an order for cleaning a first room associated with the first room label and a second room associated with the second room label during the single cleaning mission executed by the mobile cleaning robot.

2. The method of claim 1, comprising receiving data indicative of a time to complete cleaning of each of the first room and the second room.

3. The method of claim 1, comprising:
presenting, on the user interface of the mobile device, the first room label in an updated position on the list of room labels responsive to receipt of user input; and
sending, to the mobile cleaning robot, data indicative of the updated position of the first room label.

4. The method of claim 1, comprising:
removing the first room label from the presentation on the user interface of the mobile device responsive to receipt of user input indicating a cancellation of a cleaning of the first room; and
sending, to the mobile cleaning robot, data indicative of the cancellation of the cleaning of the first room.

5. The method of claim 1, comprising:
presenting, on the user interface, a representation of an operational event of the single cleaning mission; and
receiving, from the mobile cleaning robot, data indicative of the operational event of the single cleaning mission, wherein the representation of the operational event comprises a representation of a location where the mobile cleaning robot performed additional cleaning in response to detected debris.

6. The method of claim 1, comprising:
presenting, on the user interface, a representation of an operational event of the single cleaning mission; and
receiving, from the mobile cleaning robot, data indicative of the operational event of the single cleaning mission, wherein the representation of the operational event comprises a representation of a completion of the mobile cleaning robot cleaning one of the first room or the second room.

7. The method of claim 1, comprising:
presenting, on the user interface, a representation of an operational event of the single cleaning mission; and
receiving, from the mobile cleaning robot, data indicative of the operational event of the single cleaning mission, wherein the representation of the operational event comprises a representation of a time of a bin emptying event.

8. The method of claim 7, comprising presenting the representation of the time of the bin emptying event in the list of room labels.

9. The method of claim 1, comprising sending, to the mobile cleaning robot, a set of cleaning parameters to be used in each of the first room and the second room, each set of cleaning parameters including at least one of a vacuum power, an edge cleaning setting, a multiple pass setting, and a wet or dry mopping parameter.

10. The method of claim 1, comprising determining, based on a charge level of a battery of the mobile cleaning robot, a charging period for charging the battery to allow the mobile cleaning robot to complete cleaning the rooms on the list of rooms.

11. The method of claim 10, comprising sending a charging instruction indicative of the charging period to the mobile cleaning robot.

12. The method of claim 10, comprising receiving, from the mobile cleaning robot, data indicative of an elapsed charging time when the mobile cleaning robot is at a charging station.

13. The method of claim 12, comprising presenting a representation of the elapsed time on the user interface.

14. A non-transitory computer readable medium storing instructions for causing a computing system to:
present, on a user interface of a mobile device, a first room label in a first position of a list of room labels and a second room label in a second position of the list of room labels, wherein the list of room labels represents a list of rooms to be cleaned by a mobile cleaning robot during execution of a single cleaning mission, wherein one or more attributes of the list of room labels is representative of a status of the single cleaning mission during the single cleaning mission, and wherein the position of each of the first room label and the second room label on the list of room labels is adjustable by a user of the mobile device; and
send, to the mobile cleaning robot, data indicative of the first room label, the second room label, and the position of each of the first room label and the second room label on the list of room labels, wherein the relative position of the first room label and the second room label on the list determines an order for cleaning a first room associated with the first room label and a second room associated with the second room label during the single cleaning mission executed by the mobile cleaning robot.

15. The non-transitory computer readable medium of claim 14, in which the instructions cause the computing system to:
present, on the user interface of the mobile device, the first room label in an updated position on the list of room labels responsive to receipt of user input; and
send, to the mobile cleaning robot, data indicative of the updated position of the first room label.

16. The non-transitory computer readable medium of claim 14, in which the instructions cause the computing system to:
remove the first room label from the presentation on the user interface of the mobile device responsive to receipt of user input indicating a cancellation of a cleaning of the first room; and
send, to the mobile cleaning robot, data indicative of the cancellation of the cleaning of the first room.

17. The non-transitory computer readable medium of claim 14, in which the instructions cause the computing system to:
present, on the user interface, a representation of an operational event of the single cleaning mission; and
receive, from the mobile cleaning robot, data indicative of the operational event of the single cleaning mission,
wherein the representation of the operational event comprises a representation of a location where the mobile cleaning robot performed additional cleaning in response to detected debris.

18. The non-transitory computer readable medium of claim 14, in which the instructions cause the computing system to:
present, on the user interface, a representation of an operational event of the single cleaning mission; and
receive, from the mobile cleaning robot, data indicative of the operational event of the single cleaning mission,
wherein the representation of the operational event comprises a representation of a completion of the mobile cleaning robot cleaning one of the first room or the second room.

19. The non-transitory computer readable medium of claim 14, in which the instructions cause the computing system to:
present, on the user interface, a representation of an operational event of the single cleaning mission; and
receive, from the mobile cleaning robot, data indicative of the operational event of the single cleaning mission,
wherein the representation of the operational event comprises a representation of a time of a bin emptying event.

20. The non-transitory computer readable medium of claim 14, in which the instructions cause the computing system to:
determine, based on a charge level of a battery of the mobile cleaning robot, a charging period for charging the battery to allow the mobile cleaning robot to complete cleaning the rooms on the list of rooms; and
send a charging instruction indicative of the charging period to the mobile cleaning robot.

\* \* \* \* \*